(12) United States Patent
Catapano

(10) Patent No.: US 7,293,745 B2
(45) Date of Patent: Nov. 13, 2007

(54) CABLE HOLDER

(75) Inventor: Joseph P. Catapano, Huntington, NY (US)

(73) Assignee: Site Pro 1, Inc., Huntington, NY (US)

( * ) Notice: Subject to any disclaimer, the term of this patent is extended or adjusted under 35 U.S.C. 154(b) by 0 days.

(21) Appl. No.: 10/723,158

(22) Filed: Nov. 26, 2003

(65) Prior Publication Data

US 2005/0109887 A1 May 26, 2005

(51) Int. Cl.
*F16L 3/00* (2006.01)
(52) U.S. Cl. .......................................... 248/61; 248/65
(58) Field of Classification Search ................ 248/58, 248/61, 63, 65, 68.1, 74.1
See application file for complete search history.

(56) References Cited

U.S. PATENT DOCUMENTS

| | | | | |
|---|---|---|---|---|
| 2,375,513 A | * | 5/1945 | Bach | 248/59 |
| 3,463,428 A | * | 8/1969 | Kindorf et al. | 248/72 |
| 3,721,412 A | * | 3/1973 | Kindorf | 248/73 |
| 3,866,871 A | * | 2/1975 | Dupuy, Sr. | 248/59 |
| 4,016,686 A | | 4/1977 | Hartger et al. | |
| 4,493,468 A | * | 1/1985 | Roach | 248/62 |
| 4,763,132 A | | 8/1988 | Juds et al. | |
| 5,393,021 A | | 2/1995 | Nelson | |
| 5,443,232 A | * | 8/1995 | Kesinger et al. | 248/62 |
| 5,971,329 A | * | 10/1999 | Hickey | 248/68.1 |
| 5,984,243 A | * | 11/1999 | Pfaller et al. | 248/74.1 |
| 6,257,530 B1 | * | 7/2001 | Tsai | 248/74.2 |
| 6,354,543 B1 | | 3/2002 | Paske | |
| 6,382,496 B1 | | 5/2002 | Harger | |
| 6,443,402 B1 | * | 9/2002 | Ferrill et al. | 248/65 |
| 6,486,402 B2 | | 11/2002 | Harger et al. | |
| 6,622,976 B1 | * | 9/2003 | Ianello | 248/73 |
| 2002/0153157 A1 | | 10/2002 | Harger et al. | |

* cited by examiner

*Primary Examiner*—Carl D. Friedman
*Assistant Examiner*—Steven Marsh
(74) *Attorney, Agent, or Firm*—The Farrell Law Firm, P.C.

(57) ABSTRACT

A cable holder for securing multiple elongated objects to a support has a plurality of inner and outer hangers fixedly attached to one another and each configured to receive a respective one of the multiple elongated objects. The inner and outer hangers are displaceable relative to one another so that the outer hanger does not block the inner hanger during attachment of the latter to a support.

17 Claims, 4 Drawing Sheets

CABLE HOLDER

FIELD OF THE INVENTION

The invention relates to a cable holder configured to support one or more cables.

BACKGROUND OF THE INVENTION

The use of transmission line or cable hangers, or clamps, configured to attach a transmission line or cable to a support, such as an antenna tower, have been known for many years. The advent of electronic equipment has caused a few problems related to coupling of a hugely increased number of transmission lines along antenna towers due to a limited space capable of accommodating these lines. Typically, since installation of cables is associated with safety considerations as well as with the time and expense involved with installing these lines, it is highly desirable to minimize both the amount of time and the complexity of the work required for coupling cables to support structures. To address these issues, various structures of cable hangers, designed to rapidly attach cables to support structures, have been recently developed.

A typical cable holder is illustrated in FIGS. 1 and 2 and includes inner and outer cable hangers 110 coupled to one another so that the outer hanger may be added later to accommodate additional cables without disassembling the previously installed hanger(s). Attachment of the inner hanger 110 to a support 118 as well as coupling the hangers to one another are realized by compressing opposite arms 112 so that locking fingers 114 are first inserted into an opening 116 and then, upon ceasing the compressing force, spread apart to reliably engage the rim of the opening. Support 118 may be horizontally or vertically disposed, and may include a plurality of openings to accommodate multiple hangers 110.

Insertion of the cable holder may pose several problems. For example, if the cable holder, as shown in FIGS. 1 and 2, is assembled before its attachment to the support 118, the access to the inner hanger may be limited because the outer hanger blocks the inner one, which is, thus, difficult to reach manually. Note that the inner and outer hangers may rotate relative to one about an axis of symmetry S'-S' upon insertion of the locking fingers 114 into the opening 116. However, because this rotation occurs about the axis of symmetry common to both hangers, the outer hanger blocks the inner hanger regardless of the relative angular position of the hangers. Thus, this structure necessitates the use of instruments, which are a) inconvenient, since the direct access to the inner hanger is still blocked by the outer hanger, and b) undesirable, because having additional instruments on a tall tower imposes an additional physical and logistical hardship on the serviceman.

If, however, the cable holder of FIGS. 1 and 2 is deployed by initially attaching only the inner hanger with a respective cable to the support 118, further installation of the outer hanger in response to the increased demands for additional cables may be associated with difficulties caused by climatic conditions. Indeed, typically, cables are installed on tall towers. As a consequence, low temperatures and strong winds may critically complicate the attachment of the outer hanger to the inner one. Also, gradual installation of subsequent outer hangers may be associated with still another problem stemming from variations of the size of the opening 116 leading to unreliable securing the hangers to one another and to the support 118. Overall, the above-discussed problems may detrimentally affect the reliability of the installation as well as the safety of the worker.

Furthermore, the cable holder of FIGS. 1 and 2 is configured to lock a respective cable by compressing the arms of the hangers against this line upon inserting the locking fingers 114 into the opening 116. Yet, the inherent elasticity of the arms of the hanger may not be sufficient to prevent displacement of the cables along the tower for a variety of reasons. Even those hanger designs that have mechanisms for penetrating or biting into the cable jacket may not prevent longitudinal movement of the cable because the frictional coefficient between the metal hanger and the plastic cable jacket is very low. The polyethylene typically used for cable jackets is a soft material that has an inherent lubricant quality. In addition, the cable jacket can "cold flow" which reduces the holding force of the cable hanger over time, resulting in cable slippage.

It is therefore desirable to provide a stackable cable holder configured to provide an easy installment of cables as well as reliable securement thereof.

SUMMARY OF THE INVENTION

The present invention attains these objectives by providing a stackable cable holder including multiple interconnected hangers, which are displaceable relative to one another without being detached. As a consequence, even if, initially, only a single cable, which is secured to an inner hanger, is needed, the installation of subsequent lines does not pose the difficulties associated with the discussed-above prior art, since an outer hanger, configured to receive an additional line, has been already installed.

In accordance with one aspect of the invention, to facilitate access by the worker to an inner hanger couplable to a support, inner and outer hangers are displaceable relative to one another about an axis offset from a central symmetry axis. As opposed to the structure shown in FIGS. 1 and 2, displacement of the hangers about the off-center axis leads to a position in which the inner hanger can be conveniently gripped and squeezed by the worker. As a result, displacing the outer hanger relative to the inner one in accordance with the invention creates a sufficient space allowing the worker to manually attach the inner hanger to a support.

In accordance with another aspect of the invention, the outer hanger is configured to positively lock a cable in the hanger. A locking assembly is characterized by its simplicity and is configured to allow reliable accommodation of differently sized cables.

It is therefore an object of the invention to provide a cable holder overcoming drawbacks of the known prior art.

A further object of the invention is to provide a cable holder allowing securement of additional cables in a time- and labor-efficient manner; and Still a further object of the invention is to provide a reliable securement of cables to the inventive cable holder.

BRIEF DESCRIPTION OF THE DRAWINGS

The above and other features, objects and advantages will become more readily apparent from the detailed description of the invention accompanied by the following drawings, in which.

DETAILED DESCRIPTION

Figures 1, 2:
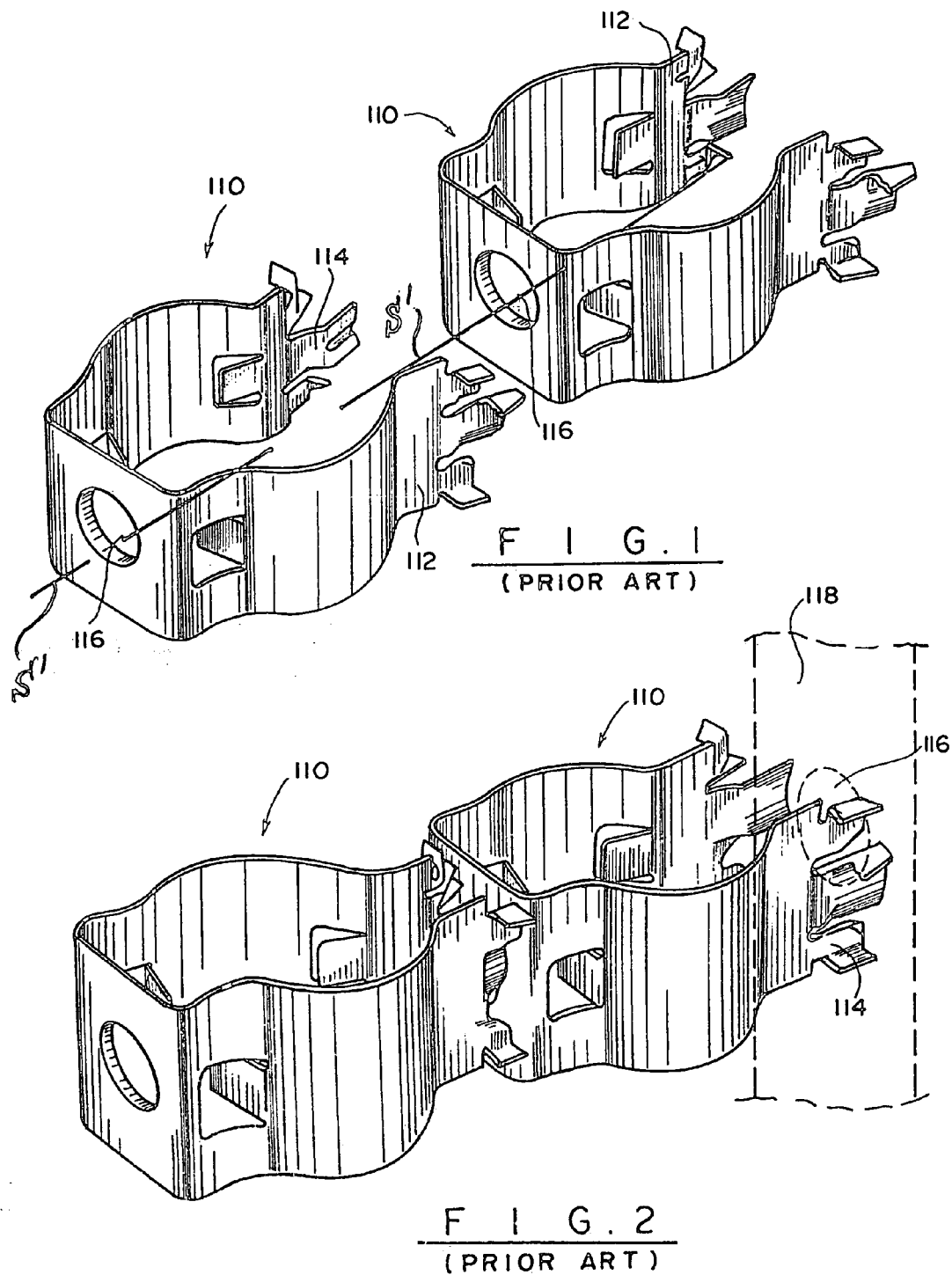
FIG. 1 is an isometric view of detached inner and outer hangers of a stackable cable holder of the known prior art.
FIG. 2 is an isometric view of the assembled cable holder of FIG. 1.
Figure 3:
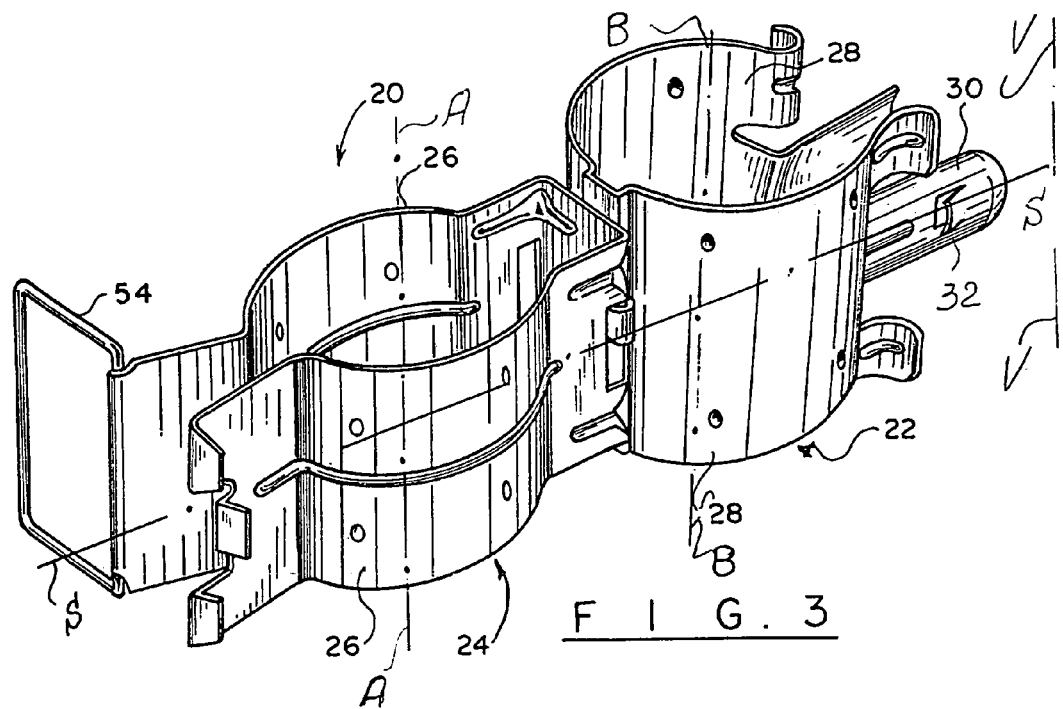
FIG. 3 is an isometric view of a stackable cable holder configured in accordance with the invention and shown in a deployed position, in which inner and outer hangers each are ready to receive a respective cable.
Figure 4:
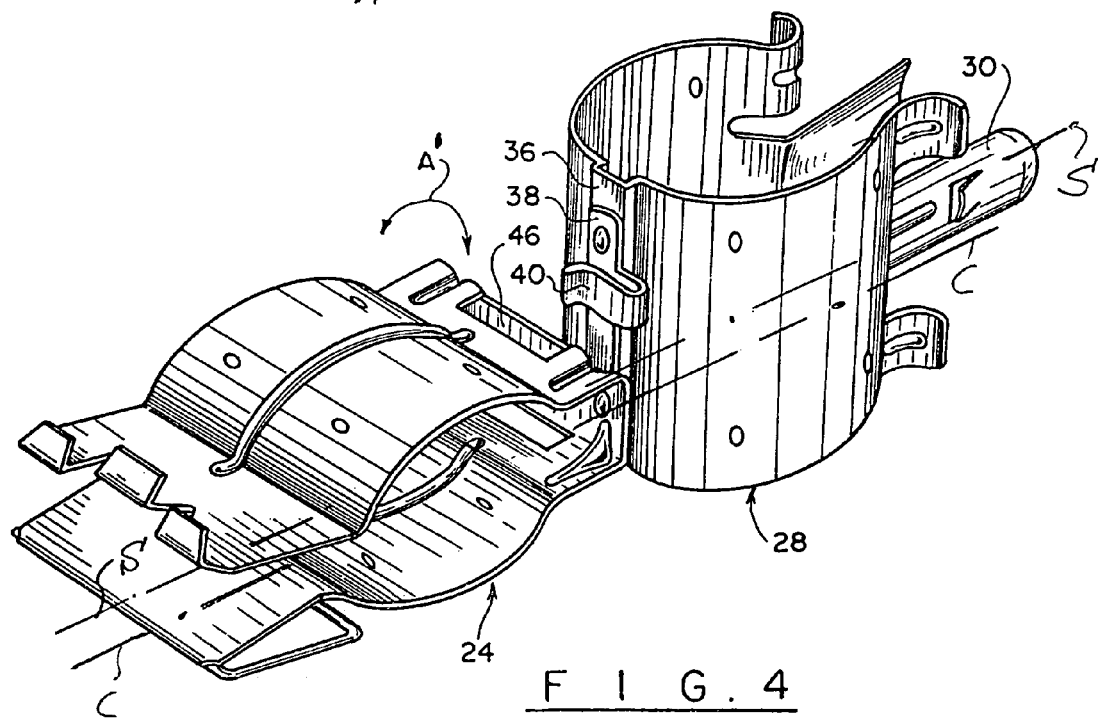
FIG. 4 is an isometric view of a stackable cable holder configured in accordance with the invention and shown in an installation position, in which the outer hanger is displaced to allow substantially the unobstructed access to the inner hanger.

Referring to FIGS. 3-4, the inventive cable holder 20 has at least one pair of coupled inner 22 and outer 24 hangers displaceable relative to one another along a direction "A"' between deployed and installation positions as shown in FIGS. 3 and 4, respectively. In accordance with one inventive embodiment, the hangers 22, 24 rotate relative to one another about an axis C-C (FIG. 4), which is offset from an axis of symmetry S-S (FIG. 4) common to both hangers in the deployed position of FIG. 3. Accordingly, in the deployed position, the axis of symmetry S-S of both hangers 22, 24 extends substantially perpendicular to a longitudinal axis V-V of an antenna tower (not shown), which complicates access to a body 28 of the inner hanger 22 by a serviceman. To facilitate this access, the outer hanger 24 is designed to move so that the body 28 is conveniently exposed to the serviceman. The serviceman then applies a compressing force to the body 28, brings the fingers 30 together to insert them into the support, which is not shown, but is similar to the one illustrated in FIG. 2. Upon ceasing the compressing force, the fingers are biased apart to have inner hook portions 34 (FIG. 5) engage the rim of the opening 116. To ensure that the inner hanger 22 would not disengage from the support 118, the fingers 30 are formed with barbs 32 extending laterally outwards from the fingers to urge against the support upon ceasing the compressing force.

Having installed the inventive cable holder 20 to the support, the outer hanger 24 is rotated to the deployed position of FIG. 3, in which the inner and outer hangers 22, 24 extend along longitudinal axis axes A-A and B-B parallel to the tower's longitudinal axis V-V. As a result, in addition to a cable locked in the inner hanger 22, an additional cable can extend through and be locked in the outer hanger 24, as will be disclosed below.

Figure 5:
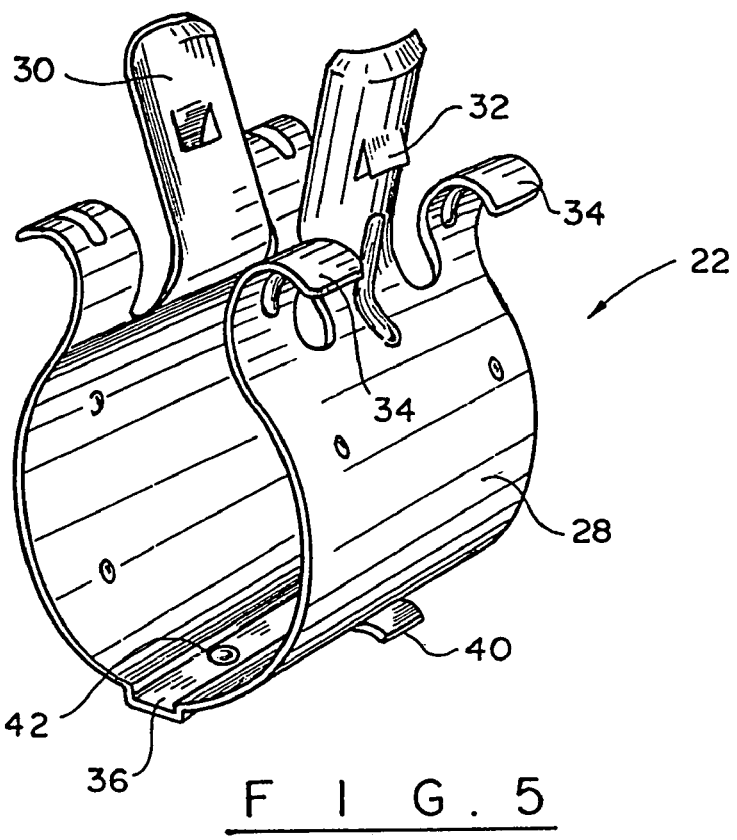
FIG. 5 is an isometric view of the inner hanger of the inventive cable holder illustrating the interior surface of the outer hanger.
Figure 6:
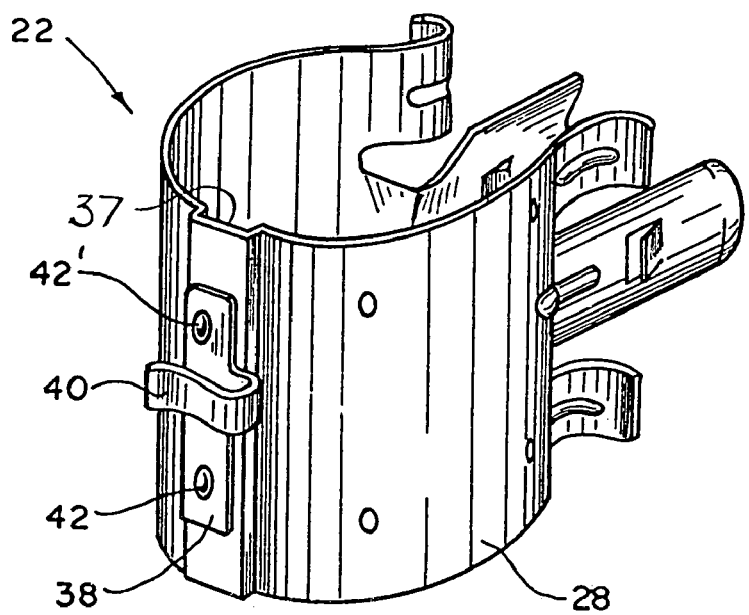
FIG. 6 is an isometric view of the inner hanger of the inventive cable holder illustrating the exterior surface of the inner hanger.

Turning specifically to FIGS. 5 and 6, the inner hanger 22 is made preferably from a relatively flexible material, such as sheet steel, and includes the body 28 configured to have a substantially "C" shape particularly convenient for gripping by the serviceman. The body 28 extends between a bottom 36 and the recessed inner ends formed with multiple hook portions 34, each pair of which defines therebetween a respective one of the fingers 30.

The bottom 36 of the body 28 is formed with a U-shaped or rectangular indent 37 interrupting an otherwise curved inner surface of the body 28 and extending outwards to support a pair of pins or rivets 42 and 42', which are either fixed to the inner hanger 22 or removably attached thereto. The pin 42 extending through both the inner and outer hangers serves as the axis of rotation C-C of the hangers relative to one another. The other pin 42' functions as an anchor frictionally engaging the outer hanger 24 in the deployed position of the holder 20, as will be explained below. One of the reasons for forming the indent 37 is to allow the pins 42 and 42' to have a sufficient length without excessively penetrating the space within the interior of the body 28, which is configured to receive a cable, this preventing inadvertent damage to the cable.

The outer side of the indent 37 serves as a support surface for the outer hanger 24 and carriers a plate 38 attached to this hanger by the pins 42 and 42'. To prevent displacement of the hangers beyond the deployed position of the cable holder 20, the plate 38 is formed with a hook 40 configured to engage and subsequently stop the outer hanger 24 in the deployed position, as will be explained hereinbelow.

Figure 7:
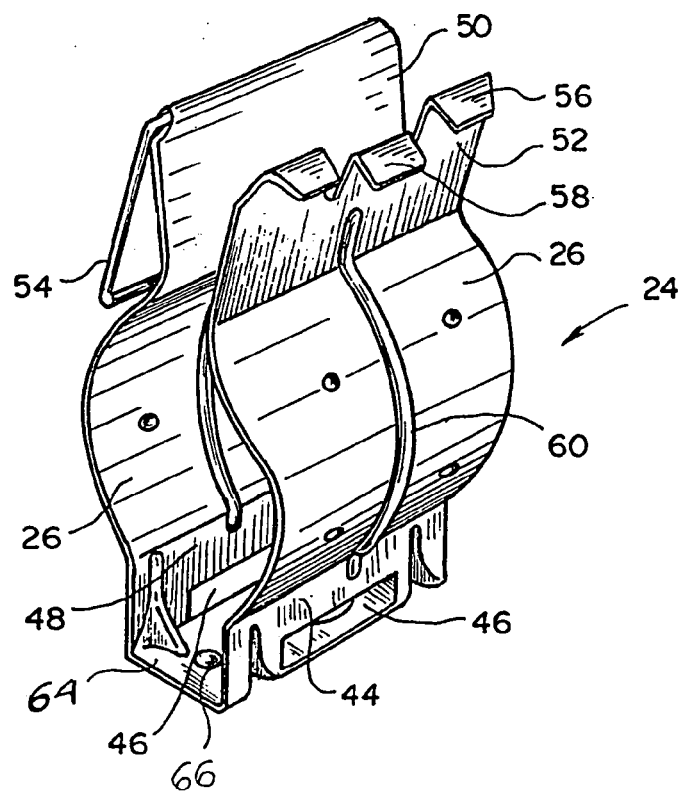
FIG. 7 is an isometric view of the outer hanger of the inventive cable holder illustrating the exterior surface of the outer hanger.

As illustrated in FIG. 7, the outer hanger 24 is formed with a body having a pair of arms 26, which, like the body 28 of the inner hanger, are made from flexible material to conform to variously dimensioned cables locked between the arms 26. The arms 26 each have a respective outwardly concave region, configured to conform to an opposing segment of cable, and a pair of planar or inwardly convex inner 44, 48 and axially opposite outer free end regions 50, 52. The inner regions 44, 48 are bridged to form a bottom 64 juxtaposed with the plate 38 and coupled thereto by the pin 42 so that the hangers 22, 24, as discussed above, rotate relative to each other. The opposite outer free end regions 50, 52 are biased away from one another and capable of yielding to a compressing force applied by the serviceman after a respective cable is positioned between the concave portions of the arms 26.

In use, when the inner hanger 22 receives a respective cable, the serviceman applies a compressive force to the body 28 engaging thus the fingers 30 with the support. During the attachment of the inner hanger 22, the outer hanger 24 is displaced to the installation position of FIG. 4, and, after the inner hanger has been mounted to the support, is rotated towards the deployed position about the pin 42. As the outer hanger rotates, its bottom 64 engages the pin 42' extending outwards from the plate 38 at a distance sufficient to prevent displacement of the outer hanger towards the deployed position unless a sufficient torque is applied thereto to overcome the pin's resistance. Having overcome this resistance, the bottom 64 of the outer hanger 24 continues to frictionally slide relative to the plate 38 until the pin 42' snaps into an opening 66 (FIG. 7) formed in the bottom 64, preventing thus further displacement of the hangers. To ensure that the hangers are locked in the deployed position, the hook 40 of the plate 38 extends through and engages recesses 46 (FIG. 7) of the inner end regions 44, 48 of the outer hanger 24. Disengagement of the hangers 22, 24 is realized by initially applying a slight force directed so that the hangers are forced away from another along the axis of symmetry S-S (FIG. 4), and, subsequently, by applying a torque force to rotate to the installation position. While the plate 38 has been disclosed as attached to the inner hanger 22, the inventive holder 20 can be easily modified so that the plate 38 is mounted to the outer hanger 24.

Locking of the cable in the outer hanger 24 can be realized by various means, one of which is illustrated in FIGS. 3, 4 and 7 and includes multiple lugs 56, 58 and a locking member 54 engaging the lugs upon compressing the outer regions 50, 52 of the outer hanger. Structurally, the locking member 54 can be brought into engagement either with a pair of spaced apart side lugs 56 formed on the terminal portion of the end region 52 or the central lug 58 depending on a diameter of a cable. If this diameter is relatively small, the locking member 54 engages the central lug 58 spaced axially inwards from the side lugs 56 so that the inner surfaces of the concave portions of the arms 26 are compressed relatively close to one another to abut the received cable. However, if the cable to be locked has a relatively large diameter, the locking member will engage the pair of side lugs 56. As can be seen in FIG. 7, the locking member 54 is configured as a frame rotatably mounted on the outer end region 50 of the outer hanger 24. A specific shape and concrete dimensions of the locking member can be modified in response to the locking requirements.

The hangers 22 and 24 are subject to substantial loads generated by the cables and, thus, should be sufficiently reinforced not to deform as a result of these loads. Accordingly many components of the hangers may be provided with reinforcing ribs, such a rib 60 formed on the arms 26 of the outer hanger 24, as shown in FIG. 7.

Figure 8:
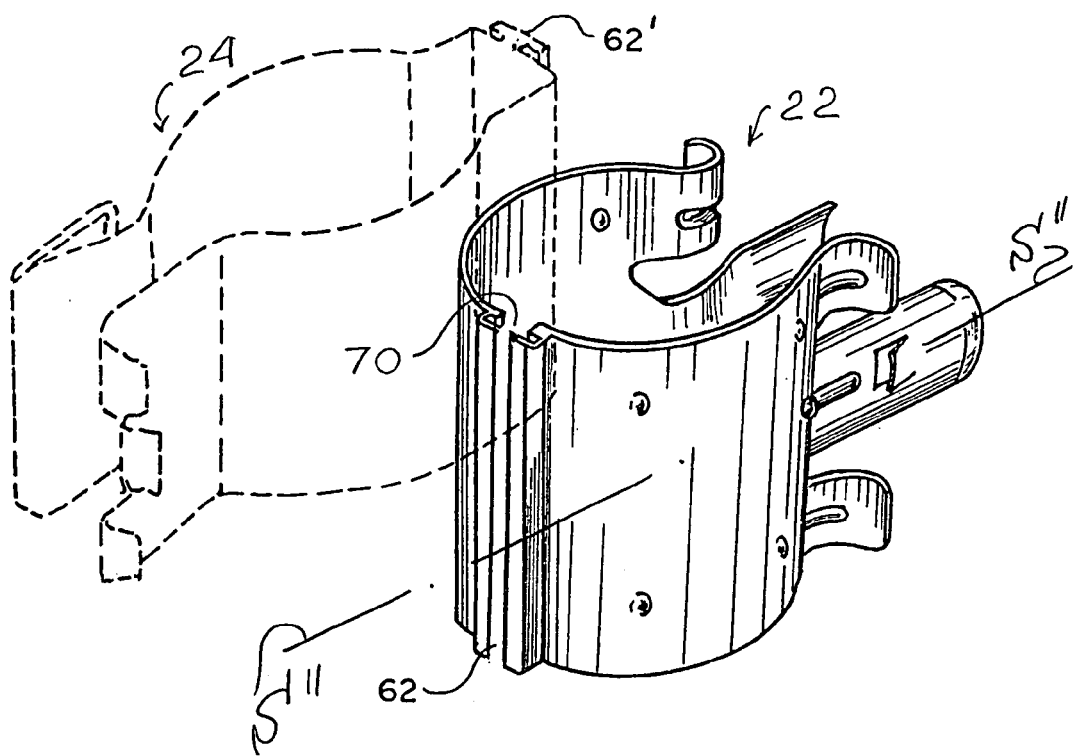
FIG. 8 is an isometric exploded view of the cable holder configured in accordance with another embodiment of the invention.

Turning to FIG. 8, a further embodiment of the invention, while utilizing the main concept including displacement of the hangers relative to one another, realizes this in a manner different from the embodiment shown in FIGS. 3-7. Instead of rotating about the rotation axis C-C (FIG. 4), the cable holder of FIG. 8 is characterized by linear motion of the inner 22 and outer 24 hangers relative to each other. In particular, one of the hangers, for example the inner hanger 22, may be provided with an outwardly extending bottom portion 62 split in half and forming a recess 70 which is shaped and dimensioned to slidably receive a T-shaped flange 62' configured complementary to the inner surface of the recess. In use, upon inserting the flange 62' into the recess 70, the hangers can slide relative to one another between the deployed position, in which the hangers coaxially extend along an axis of symmetry S"-S", and the installation position, in which the outer hanger is displaced so that the body of the inner hanger is substantially unobstructed. The positions of the T-shaped flange 62' and the bottom portion 62 can be reversed.

It will be understood that various modifications may be made to the embodiments disclosed herein which can find a variety of applications expanding the scope of the invention beyond the disclosed coupling of cables. For example, the inventive holder can be utilized for installing elongated objects, such as pipes or tubes and a variety of transmission lines. Therefore, the above description should not be construed as limiting, but merely as exemplifications of preferred embodiments. Those skilled in the art will envision other modifications within the scope and spirit of the claims appended hereto.

What is claimed is:

1. A cable holder for installing a plurality of elongated objects, the cable holder comprising:
   inner and outer hangers each having a respective axis of symmetry and displaceably coupled to one another, the hangers being capable of being adjusted from a deployed position, in which the axes of symmetry of the inner and outer hangers are aligned, to an installation position, in which the axes of symmetry of the inner and outer hangers are offset; and
   a pair of spaced apart pins straddling the axis of symmetry of the inner hanger and extending parallel thereto, one of the pins extending through and coupled to the outer hanger so that the inner and outer hangers are rotatable relative to one another between the deployed and installation position.

2. The cable holder of claim 1, wherein the inner and outer hangers each have a respective body shaped and dimensioned to receive and secure a respective elongated object upon displacing the inner and outer hangers from the installation position to the deployed position, in which the elongated objects extend parallel to one another.

3. The cable holder of claim 2, wherein the body of the inner hanger has a substantially C-shape defining a pair of arms, which are spaced equidistantly from the axis of symmetry of the inner hanger in opposite lateral directions and are biased outwards from one another to define therebetween a space configured to receive the respective elongated object.

4. The cable holder of claim 3, wherein the pair of arms of the inner hanger each are recessed to have a respective pair of spaced apart hook portions defining therebetween a finger, which is configured so that as the arms are compressed towards one another, the fingers penetrate an aperture of a support at a distance sufficient for the hook portions to engage a rim of the aperture upon ceasing an external compressive force applied to the arms of the inner hanger.

5. The cable holder of claim 4, wherein the fingers each have a respective locking barb extending laterally outwards and configured to lock against the rim of the aperture of the support.

6. The cable holder of claim 3, wherein the C-shaped body of the inner hanger has a U-shaped recessed region spaced midway between the pair of arms and extending perpendicular to the axis of symmetry of the inner hanger so that the U-shaped recessed region interrupts a continuous curvature of the C-shaped body to allow the pair of arms to flex upon applying a compressive force thereto relative to the U-shaped recessed region.

7. A cable holder for installing a plurality of elongated objects, comprising inner and outer hangers each having a respective axis of symmetry and displaceably coupled to one another, the hangers being capable of being adjusted from a deployed position, in which the axes of symmetry of the inner and outer hangers are aligned, to an installation position, in which the axes of symmetry of the inner and outer hangers are offset,
   the inner and outer hangers each have a respective body shaped and dimensioned to receive and secure a respective elongated object upon displacing the inner and outer hangers from the installation position to the deployed position, in which the elongated objects extend parallel to one another,
   the body of the inner hanger has a substantially C-shape defining a pair of arms, which are spaced equidistantly from the axis of symmetry of the inner hanger in opposite lateral directions and are biased outwards from one another to define therebetween a space configured to receive the respective elongated object, and
   the C-shaped body of the inner hanger has a U-shaped recessed region spaced midway between the pair of arms and extending perpendicular to the axis of symmetry of the inner hanger so that the U-shaped recessed region interrupts a continuous curvature of the C-shaped body to allow the pair of arms to flex upon applying a compressive force thereto relative to the U-shaped recessed region;
   further comprising a pair of spaced apart pins straddling the axis of symmetry of the inner hanger and extending parallel thereto through the U-shaped recessed region, one of the pins extending through and coupled to the outer hanger so that the inner and outer hangers are rotatable relative to one another between the deployed and installation positions.

8. The cable holder of claim 7, wherein the other pin is shaped and dimensioned to frictionally engage the outer hanger in the deployed position of the inner and outer hangers.

9. The cable holder of claim 8, wherein the outer hanger is provided with an opening shaped to snappingly receive the other pin in the deployed position, the cable holder further comprising a plate extending between the inner and outer hangers perpendicular to the axes of symmetry of the inner hanger and provided with a hook configured to provide engagement and prevent further displacement between the inner and outer hangers in the deployed position.

10. The cable holder of claim 9, wherein the plate is mounted to one of the inner hanger or outer hanger.

11. The cable holder of claim 9, wherein the body of the outer hanger has a pair of arms each provided with:
   a respective inner and outer free end portion spaced axially from one another, the inner portions of pair of arms being fixed to one another to form a U-shaped inner region of the body of the outer hanger adjacent to the plate, and
   a respective central outwardly concave portion bridging respective inner and outer free end portions, wherein the central outwardly concave portions of the pair of arms are juxtaposed with one another to define a space receiving a respective elongated object.

12. The cable holder of claim 11, wherein the U-shaped inner region of the body of the outer hanger has
   a recess, configured to receive and engage the hook of the plate in the deployed position of the inner and outer hangers, and
   at least one opening receiving the other pin in the deployed position of the inner and outer hangers.

13. The cable holder of claim 11, wherein the outer free end portion of one of the pair of arms of the outer hanger is recessed to have two end lugs flanking a central lug, the two end lugs being aligned with one another and offset relative to the central lug.

14. The cable holder of claim 13, wherein the other outer free end portion of the other one of the pair of arms has a locking member mounted rotatably to selectively engage the central lug of the one arm upon receiving a respective elongated object of a relatively small diameter between the pair of arms of the outer hanger or the end lugs thereof upon receiving a respective elongated object of a relatively large diameter.

15. The cable holder of claim 11, wherein the body of the outer hanger is provided with at least one reinforcing rib, the respective elongated object being a cable or a pipe.

16. The cable holder of claim 2, wherein the inner and outer hangers are slidably coupled to and linearly displaceable relative to one another in a plane extending parallel to a longitudinal direction of the elongated objects between the deployed and installation positions.

17. The cable holder of claim 16, wherein one of the inner and outer hangers is provided with a recess slidably receiving a flange, which is provided on the other one of the inner and outer hangers so that the inner and outer hangers slide relative to one another between the deployed and installation positions.

* * * * *